(12) United States Patent
Hosein et al.

(10) Patent No.: US 7,742,455 B2
(45) Date of Patent: Jun. 22, 2010

(54) SCHEDULING METHOD FOR WIRELESS PACKET DATA CHANNEL

(75) Inventors: Patrick A. Hosein, San Diego, CA (US); Mahesh A. Makhijani, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1287 days.

(21) Appl. No.: 11/249,248

(22) Filed: Oct. 13, 2005

(65) Prior Publication Data

US 2006/0153216 A1 Jul. 13, 2006

Related U.S. Application Data

(60) Provisional application No. 60/629,544, filed on Nov. 19, 2004.

(51) Int. Cl.
*H04Q 7/00* (2006.01)
(52) U.S. Cl. ................... 370/338; 370/335; 370/342; 370/412
(58) Field of Classification Search ................ None
See application file for complete search history.

(56) References Cited

U.S. PATENT DOCUMENTS

| | | | | |
|---|---|---|---|---|
| 6,590,890 | B1 * | 7/2003 | Stolyar et al. | 370/349 |
| 6,807,426 | B2 * | 10/2004 | Pankaj | 455/453 |
| 7,099,682 | B2 * | 8/2006 | Ben-Eli | 455/513 |
| 2003/0039213 | A1 | 2/2003 | Holtzman et al. | |
| 2003/0067935 | A1 | 4/2003 | Hosein | |
| 2003/0202485 | A1 * | 10/2003 | Mansfield | 370/328 |

OTHER PUBLICATIONS

Zheng et al., "The Performance of Voice Over IP Over 3G Downlink Shared Packet Channels Under Different Delay Budgets," Oct. 6-9, 2003, XP010702281.
Dost et al., "A Feasibility Study of Two User Downlink Transmission of IS-856 System," Sep. 5, 2004, XP010754289.
Soong, Anthony, et al. "Forward High-Speed Wireless Packet Data Service in IS-2000—IxEV-DV." IEEE Communications Magazine, Aug. 2003, pp. 170-177.
Bender, Paul, et al. "CDMA/HDR: A Bandwidth-Efficient High-Speed Wireless Data Service for Nomadic Users." IEEE Communications Magazine, Jul. 2000, pp. 70-77.

* cited by examiner

*Primary Examiner*—Duc C Ho
(74) *Attorney, Agent, or Firm*—Coats & Bennett, P.L.L.C.

(57) ABSTRACT

A scheduler at a base station may schedule packet data traffic based on a ranking metric that varies directly with the mobile station's scheduling downlink transmission rate and a delay factor indicative of the staleness of the corresponding queued data. The ranking metric may advantageously vary in a direct non-linear fashion with the delay factor to allow for delay sensitive data, such as VoIP data, to be scheduled with increased urgency when quality of service is about to be compromised. The scheduler may attempt to pack a multi-user downlink physical layer packet by selecting a tentative rate and determining if an aggregate amount of data in the packet may be increased by transmitting the packet at a lower rate. If so, additional queued data is added to the packet and the transmission rate for the packet is lowered. Such an approach allows for greater link efficiency to be achieved.

22 Claims, 5 Drawing Sheets

SCHEDULING METHOD FOR WIRELESS PACKET DATA CHANNEL

RELATED APPLICATIONS

This application claims the benefit of U.S. Provisional Patent Application 60/629,544 filed Nov. 19, 2004, which is incorporated herein by reference.

BACKGROUND OF THE INVENTION

The present invention relates to mobile communication systems; and, more particularly, to methods of scheduling a time shared downlink packet data channel.

The demand for wireless data services, such as mobile Internet, video streaming, and voice over IP (VoIP), have led to the development of high speed packet data channels to provide high data rates needed for such services. High speed packet data channels are employed on the forward link in IS-2000 (also known as 1xEV-DV), IS-856 (also known as 1xEV-DO), and Wideband Code Division Multiple Access (WCDMA) systems. The high speed packet data channel is a time shared channel. Downlink transmissions, e.g., from a base station to the mobile stations, are time-multiplexed and transmitted at full power.

At any given time, the base station may transmit a packet to one or more mobile stations on the physical layer channel known as the downlink high speed packet data channel. Deciding which mobile station(s) to serve with the packet at a given time is the function of a "scheduler." A number of different scheduling strategies can be used, each with a different implication for system throughput and fairness. Typical scheduling strategies employed include round-robin, maximum throughput, and proportional fairness. In addition, quality of service requirements frequently add scheduling complexities. For example, VoIP packet data, due to its conversational characteristic, typically has a relatively short maximum allowed transmission delay before service is considered to have unacceptably degraded. Thus, it is commonly necessary to schedule VoIP packet data for transmission more frequently than other packet data in order to maintain acceptable service.

However, simply scheduling VoIP packet data more frequently, without more, may result in inefficient use of available resources. This is because VoIP data is typically supplied at relatively low rate. As a result, VoIP data queued for transmission to a particular mobile station is typically less than a full packet's worth of data. Thus, if only that VoIP packet data is transmitted in a given physical layer packet, the packet is likely less than full, and typically significantly less than full. Transmitting less than full packets, particularly relatively lightly loaded packets, unnecessarily consumes available system resources, and may result in a degradation to the service provided to the other mobile stations being served by a given base station.

Thus, there remains a need for alternative scheduling and/or packet filling techniques, advantageously techniques that are better adapted to the downlink transmissions of VoIP data on high speed packet data channels.

SUMMARY OF THE INVENTION

In one embodiment, a scheduler, typically having one or more processing circuits and forming a portion of a base station, schedules use of a downlink packet data traffic channel shared by a plurality of mobile stations by ranking at least some of the mobile stations based on delay. The scheduler employs a scheduling approach that comprises: calculating a ranking metric for a mobile station that varies directly with the mobile station's scheduling downlink transmission rate and a delay factor indicative of the staleness of the data queued for the mobile station; and scheduling one or more downlink transmissions to the mobile station on the packet data traffic channel based on the ranking metric. The ranking metric may advantageously vary in a direct non-linear fashion with the delay factor. The calculating the ranking metric may comprise calculating the ranking metric as a function of the scheduling rate divided by the difference between a threshold and the delay factor. The threshold may represent the maximum allowed delay, and the delay factor may be based on an amount of elapsed time associated with the oldest of the data queued for the mobile station. In some embodiments, the ranking metric RANK varies according to the formula $RANK=R/(d_{max}-d)^k$, where R represents the mobile station's scheduling downlink transmission rate, $d_{max}$ represents the threshold value of the maximum allowed delay, d represents the current delay factor, and k is a sensitivity exponent. K may equal one. The delay factor may be based on an amount of buffer consumed by the queued data. In some embodiments, the ranking metric RANK varies according to the formula $RANK=R/(q_{max}-q)^k$, where R represents the mobile station's scheduling downlink transmission rate, $q_{max}$ represents the threshold value of the maximum allowed buffer size, q represents the current amount of buffer consumed by the queued data, and k is a sensitivity exponent. Queued data is advantageously transmitted to the mobile station based on the scheduling in a multi-user downlink packet on the shared downlink packet data channel. Such an approach allows for delay sensitive data, such as VoIP data, to be scheduled with increased urgency when quality of service is about to be compromised. The valued of sensitivity factor k may be modified to increase the effective capacity of the packet data traffic channel or to increase quality of service to the relevant mobile station. A corresponding apparatus is also described.

In another embodiment, a scheduler, typically having one or more processing circuits and forming a portion of a base station, attempts to pack a multi-user wireless downlink physical layer packet with data queued for a plurality of mobile stations using a method that comprises: selecting as a tentative downlink transmission rate a scheduling downlink transmission rate associated with a primary mobile station identified based on a scheduling algorithm; determining if an aggregate amount of data in the packet may be increased by transmitting the packet at a downlink transmission rate lower than the tentative rate; selecting a downlink transmission rate for the packet based on the determining; the packet including data queued for the primary mobile station. The method may further comprise selectively adding, based on the determining, data queued for at least one additional mobile station to the packet; the at least one additional mobile station having an associated scheduling downlink transmission rate lower than the tentative rate. The method may further comprise adding data queued for at least one supplemental mobile station to the packet, the at least one supplemental mobile station having an associated scheduling downlink transmission rate that is equal to or higher than the tentative rate. The adding data queued for at least one supplemental mobile station to the packet may advantageously occur prior to the determining. The determining may comprise calculating a first amount of data to be transmitted in the packet at the tentative rate and comparing the first amount against a threshold. The threshold typically is a ratio with respect to a data payload capacity of the packet if transmitted at the tentative rate. Failing to satisfy the threshold typically indicates that an aggregate amount of data in the packet may be increased if a downlink transmission rate associated with the packet is lowered. Such an approach allows for greater link efficiency to be achieved. A corresponding apparatus is also described.

In another embodiment, a scheduler, typically having one or more processing circuits and forming a portion of a base station, attempts to pack a multi-user wireless downlink physical layer packet with data queued for a plurality of mobile stations using a method that comprises: selecting a tentative downlink transmission rate and primary mobile station to be transmitted to for the packet; wherein all of the queued data for the primary mobile station fails to fill the packet at the tentative downlink transmission rate; determining if data queued for one or more additional mobile stations could be added to the packet if the downlink transmission rate was lowered from the tentative downlink transmission rate to a second downlink transmission rate; and selecting a downlink transmission rate for the packet based on the determining. The method may advantageously comprise selectively adding queued data for the one or more additional mobile stations to the packet based on the determining. The determining may comprise identifying one or more candidate mobile stations having an associated scheduling downlink transmission rate lower than the tentative downlink transmission rate, such as one step lower than the tentative downlink transmission rate. The determining may comprise comparing an aggregate amount of queued data allocated to the packet to a data payload capacity of the packet at the tentative downlink transmission rate. The method may further comprise, prior to the determining, adding data queued for a second mobile station to the packet; the second mobile station having an associated scheduling downlink transmission rate of at least the tentative downlink transmission rate. The determining may further comprise determining if data queued for other mobile stations could be added to the packet if the downlink transmission rate for the packet was lowered from the second downlink transmission rate to a third downlink transmission rate lower than the second downlink transmission rate. A corresponding apparatus is also described.

The above aspects may utilized individually or in combination, as is desired.

DETAILED DESCRIPTION OF THE INVENTION

Figure 1:
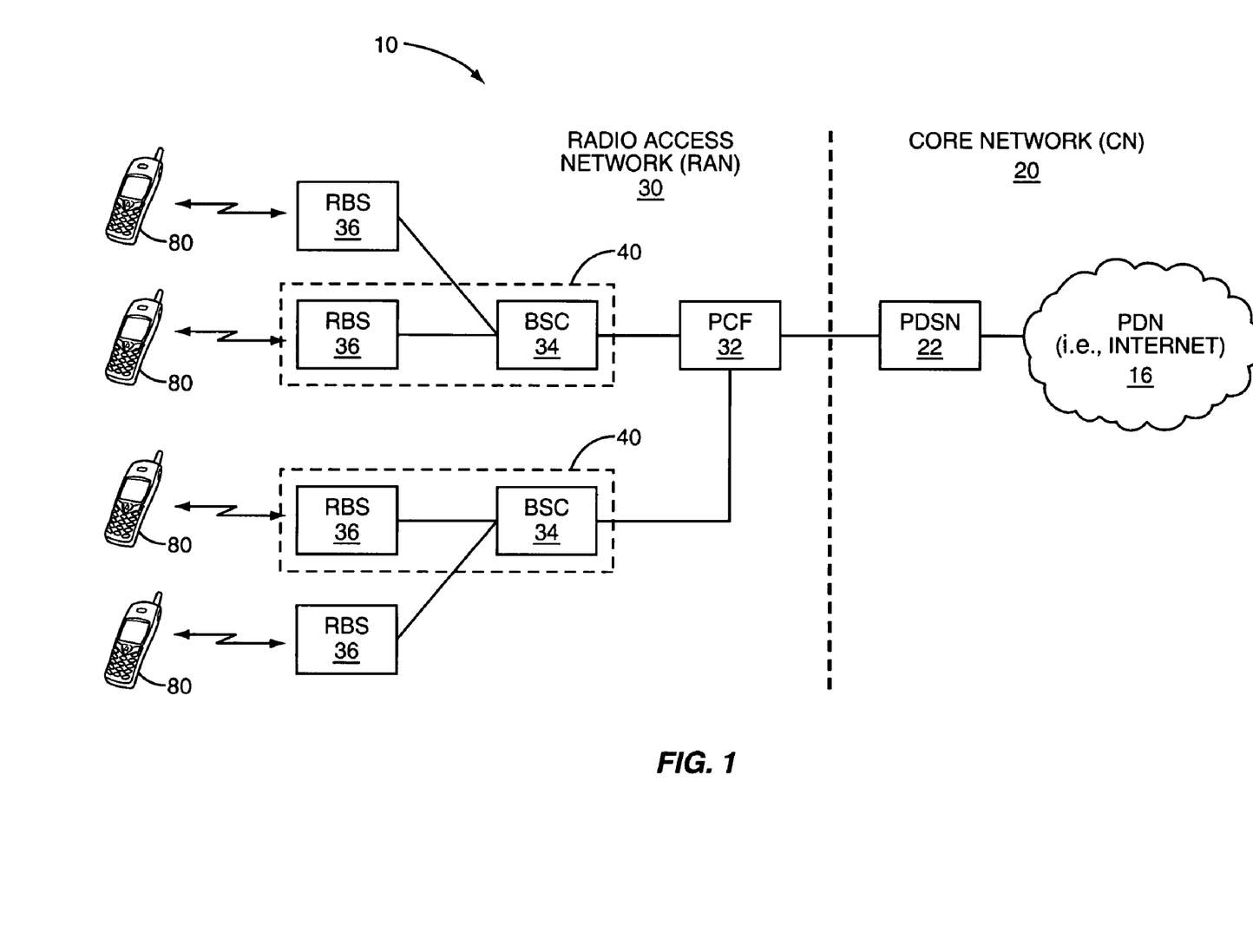
FIG. 1 shows an exemplary wireless communication network.

FIG. 1 illustrates logical entities of an exemplary wireless communication network 10 that provides packet data services to mobile stations 80. FIG. 1 illustrates a wireless communication network 10 configured according to the IS-2000 standard. Other standards, including 1xEV-DO and WCDMA, could also be employed depending on circumstances.

The wireless communication network 10 is a packet-switched network that employs a Forward Traffic Channel (FTC) known as the high-speed forward packet data channel (F-PDCH) to transmit data to the mobile stations 80. Wireless communication network 10 comprises a packet-switched core network 20 and a radio access network (RAN) 30. The core network 20 includes a Packet Data Serving Node (PDSN) 22 that connects to an external packet data network (PDN) 16, such as the Internet, and supports PPP connections to and from the mobile stations 80. Core network 20 adds and removes IP streams to and from the RAN 30 and routes packets between the external packet data network 16 and the RAN 30.

RAN 30 connects to the core network 20 and gives mobile stations 80 access to the core network 20. RAN 30 includes a Packet Control Function (PCF) 32, one or more base station controllers (BSCs) 34 and one or more radio base stations (RBSs) 36. The primary function of the PCF 32 is to establish, maintain, and terminate connections to the PDSN 22. The BSCs 34 manage radio resources within their respective coverage areas. The RBSs 36 include the radio equipment for communicating over the air interface with mobile stations 80. A BSC 34 can manage more than one RBSs 36. In cdma2000 networks, a BSC 34 and an RBS 36 comprise a base station 40. The BSC 34 is the control part of the base station 40. The RBS 36 is the part of the base station 40 that includes the radio equipment and is normally associated with a cell site. In cdma2000 networks, a single BSC 34 may function as the control part of multiple base stations 40. In other network architectures based on other standards, the network components comprising the base station 40 may be different but the overall functionality will be the same or similar.

Figure 2:
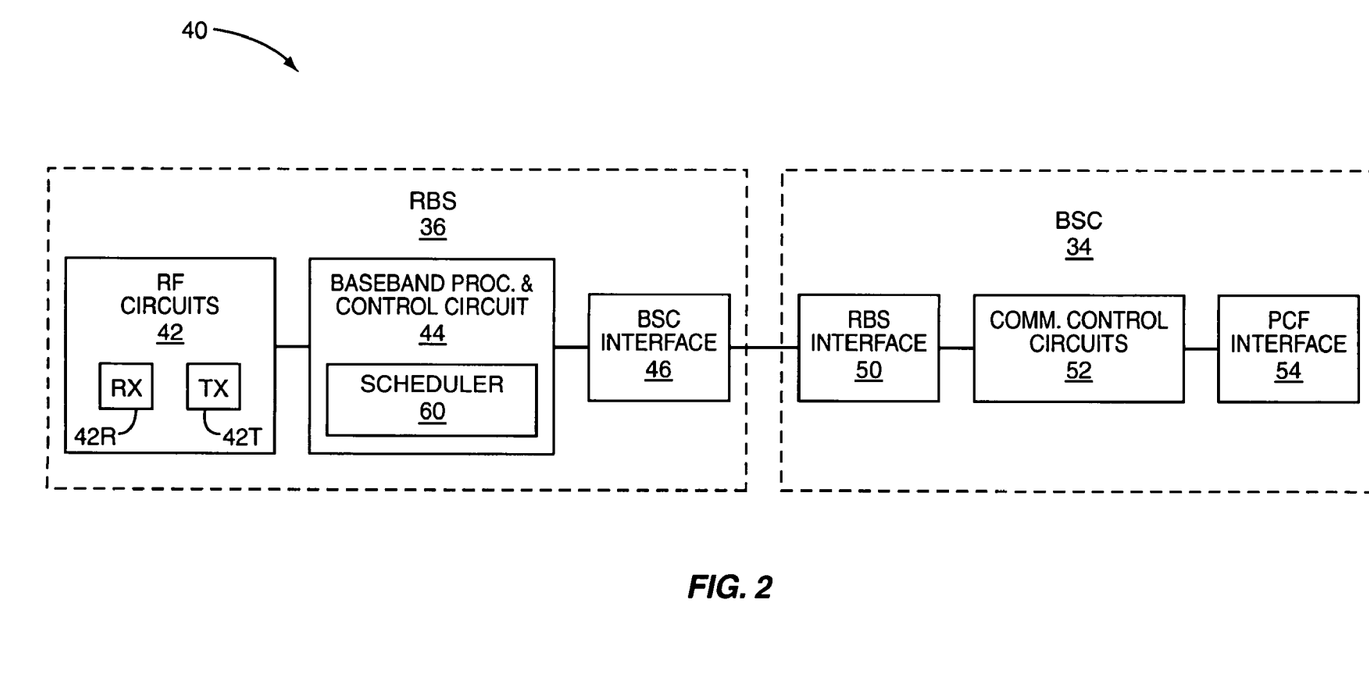
FIG. 2 shows an exemplary base station for a mobile communication network.

FIG. 2 illustrates exemplary details of a base station 40 in a cdma2000 network. The base station components in the exemplary embodiment are distributed between a RBS 36 and a BSC 34. The RBS 36 includes RF circuits 42, baseband processing and control circuits 44, and interface circuits 46 for communicating with the BSC 34. The RF circuits 42 include one or more transmitters 42T and receivers 42R, which transmit signals to, and receive signals from, the mobile stations 80. For example, the receiver 42T receives the channel quality indicators (CQIs) and/or data rate control (DRC) values reported by the mobile stations 80 and passes the same on to the baseband processing and control circuits 44 for processing. The baseband processing and control circuits 44 perform baseband processing of transmitted and received signals. In the embodiment shown in FIG. 2, the baseband processing and control circuit 44 includes a scheduler 60 to schedule packet data transmissions on the Forward Packet Data Channel (F-PDCH). The baseband processing and control circuit 44 may be implemented in software, hardware, or some combination of both. For example, the baseband processing and control circuit 44 may be implemented as stored program instructions executed by one or more microprocessors or other logic circuits included in RBS 36.

The BSC 34 includes interface circuits 50 for communicating with the RBS 36, communication control circuits 52, and interface circuits 54 for communicating with the PCF 32. The communication control circuits 52 manage the radio and communication resources used by the base station 40. The communication control circuits 52 are responsible for setting up, maintaining and tearing down communication channels between the RBS 36 and mobile station 80. The communication control circuits 52 may also allocate Walsh codes and perform power control functions. The communication control circuits 52 may be implemented in software, hardware, or some combination of both. For example, the communication control circuits 52 may be implemented as stored program instructions executed by one or more microprocessors or other logic circuits included in BSC 34.

Figure 3:
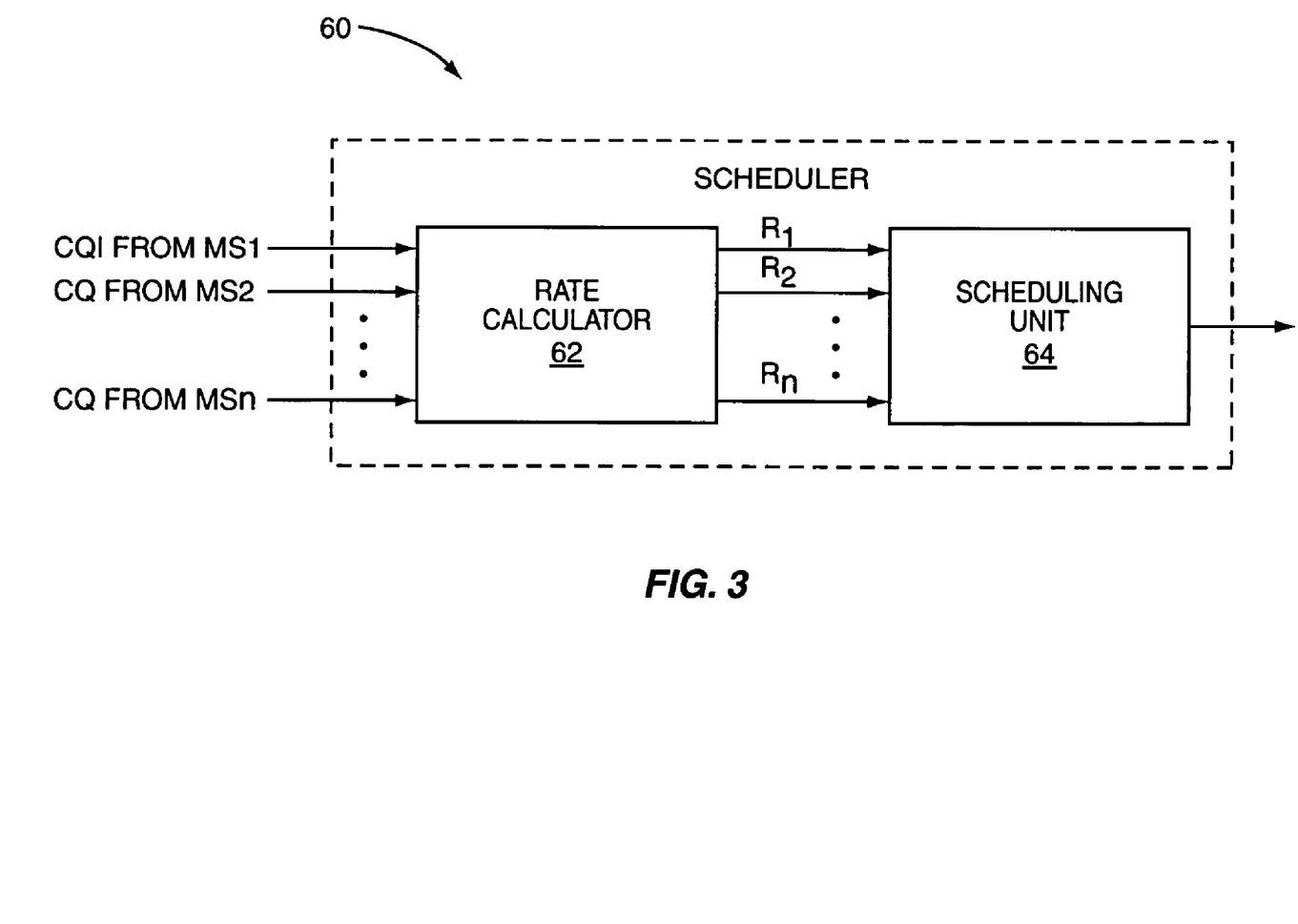
FIG. 3 shows exemplary scheduler logic circuits for a wireless communication network.

FIG. 3 illustrates a scheduler 60 according to one exemplary embodiment of the invention. The scheduler 60 makes scheduling decisions and selects the appropriate modulation and coding schemes based on, inter alia, channel feedback from the mobile stations 80. The scheduler 60 may be implemented as one or more processing circuits, comprising hardware, software, or any combination thereof, that are configured as appropriate to implement one or more of the processes described herein. The scheduler 60 conceptually includes a rate calculator circuit 62 and a scheduling unit circuit 64.

Figure 4:
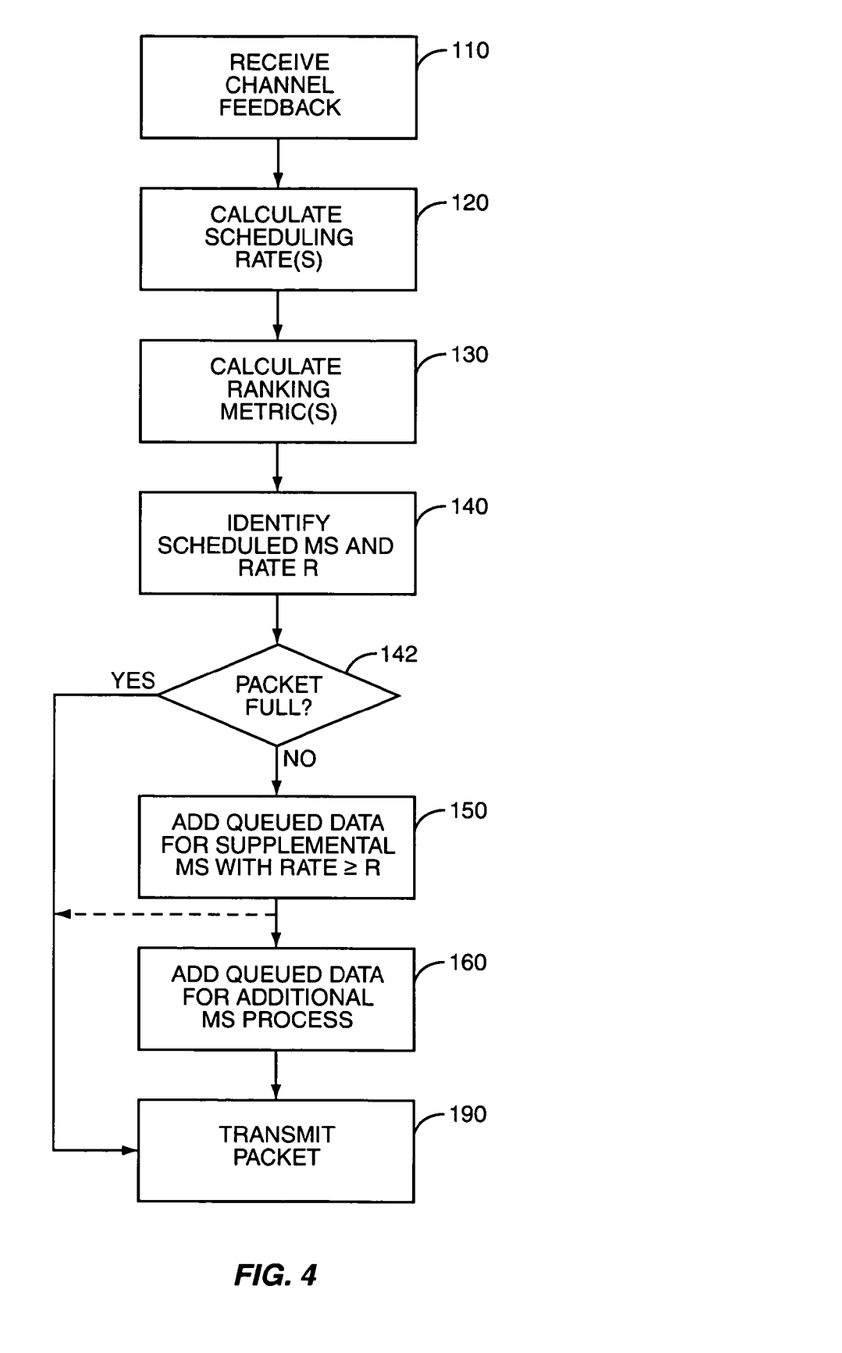
FIG. 4 shows a flowchart for an exemplary scheduling approach.

As is customary, the rate calculator 62 receives the channel quality indicators (CQIs) reported by the mobile stations 80 (step 110) and uses the CQIs to set a scheduling data transmission rate for each mobile station 80. Typically, the rate calculator 62 maps the reported CQI values to one of a set of predefined modulation and coding schemes, which in turn determines the "scheduling" data rate R for that mobile station (step 120). Alternatively, the rate calculator 62 may use reported DRC values to determine the scheduling data rate R. Of course, any suitable method for establishing the scheduling data rate R known in the art may used. The scheduling rate R for each mobile station is input to the scheduling unit 64 for making scheduling decisions.

The scheduling unit 64 uses a scheduling algorithm to schedule users. In a broad sense, the scheduling algorithm calculates, at periodic intervals, a rank (or ranking metric) for each mobile station having queued data (step 130), and then schedules the transmission of physical layer packets to those mobile stations based on the ranking metrics. Each mobile station, or class of mobile station (or class of service to a mobile station), may have a different formula for calculating the scheduling ranking metric, see U.S. patent application Ser. No. 09/972,793, entitled "System and Methods For User Scheduling in a Communications Network," which is incorporated herein by reference. As an example relevant to the present invention, VoIP users may have a formula for calculating a ranking metric that emphasizes delay on a non-linear basis. In particular, such users may have a ranking metric $RANK=R/(d_{max}-d)^k$, where R represents the mobile station's scheduling downlink transmission rate from the rate calculator 62 (see above), $d_{max}$ represents the delay threshold before quality of service is expected to become unacceptable due to delay, d represents the current delay, and k is a sensitivity exponent. The delay threshold $d_{max}$ is established based quality of service considerations, typically by the service provider, based on allowed end-to-end delay budgets and expected delays elsewhere in the communication path. The current delay d corresponds to the current amount of delay, or latency, of the data queued for that mobile station. The sensitivity factor k helps establish how sensitive the RANK function is to delay. The sensitivity factor k may have any positive value, integer or otherwise, with increasing values of k being less sensitive to delay. When the current delay d is substantially less than $d_{max}$, then the RANK formula above acts very much like a maximum throughput ranking formula. However, as the current delay d approaches $d_{max}$, the value of RANK becomes heavily influenced by the current delay, reaching a maximum when $d=d_{max}$. Thus, when the current delay is high, the value of RANK becomes relatively higher for a given scheduling transmission rate R.

As pointed out above, the current delay d corresponds to the current amount of delay, or latency, of the data queued for the particular mobile station of interest. The current delay d may be established in a variety of ways. For example, the current delay d may be the delay experienced by the oldest data in the relevant queue. Alternatively, the current delay d may be the expected delay, under current or historical conditions, of the data most recently received into the relevant queue. Of course, other approaches to establishing the current delay d may be used, provided that they correspond to the current amount of delay associated with the data queued for the particular mobile station of interest If the input rate of the queued data is assumed to be constant, then, as another method of sensitizing the rank calculation to delay, buffer size may be used as a proxy for delay. More particularly, the equation for RANK may be changed to $RANK=R/(q_{max}-q)^k$, where R represents the mobile station's scheduling downlink transmission rate from the rate calculator 62 (see above), $q_{max}$ represents the threshold buffer size for the queued data before unacceptable degradation in quality of service due to delay is expected, q represents the amount of buffer consumed by the presently queued data for that mobile station, and k is the sensitivity exponent. Similarly to the above, the maximum allowed buffer size $q_{max}$ is established based on quality of service considerations and delay budgets, with an assumption of constant input rate to the queued data buffer.

For simplicity both delay d and current buffer size q may be referred to as a delay factor. Thus, for both of the above formulas, the value of RANK for a given scheduling transmission rate R varies directly, but non-linearly, with an increasing delay factor. Further, both formulas represent ways to calculate the ranking metric RANK as a function of the scheduling transmission rate R divided by the difference between a threshold and the delay factor. Also, it should be noted that the value of the sensitivity factor k need not be constant. Instead, the sensitivity factor k may be adjusted to improve system capacity or quality of service (QoS). The base station 40 may increase the value of the sensitivity factor k, making the ranking metric less sensitive to delay for small delays, in order to increase system capacity. Alternatively, the base station 40 may decrease the value of the sensitivity factor k, making the ranking metric more sensitive to delay for small delays, in order to improve quality of service.

Armed with the ranking metric of each of the mobile stations having queued data, the scheduling unit 64 selects the mobile station having the highest value of RANK as the mobile station to be transmitted to for the corresponding physical layer packet on the downlink packet data channel (step 140). For ease of reference, that mobile station is sometimes identified herein as the "primary scheduled mobile station," or simply "primary mobile station." The primary mobile station will have an associated scheduling downlink transmission rate R, as discussed above. For purposes of identification, this rate may be referred to as the tentative downlink transmission rate, for reasons explained further below.

In some embodiments of the present invention, the packet is then transmitted to the primary mobile station at the tentative downlink transmission rate, in any conventional fashion known in the art (step 190). However, in other embodiments, the amount of data queued for the primary mobile station is evaluated to determine if the corresponding packet would be full, if transmitted at the tentative downlink transmission rate, with only data queued for the primary mobile station included in the packet's payload (step 142). If the primary mobile station has sufficient queued data to fill the packet (if transmitted at the tentative rate), then the tentative rate is selected as the downlink transmission rate and the packet is transmitted at that rate. If the data queued for the primary mobile station is insufficient to fill the packet, then other queued data is advantageously added to the packet, as discussed further below, in order to achieve better overall system throughput.

The data added to the packet may first come from data queued for other mobile stations that have an associated scheduling rate R that is the same as the primary mobile station (step 150). For example, the scheduling unit 64 may evaluate the list of candidate mobile stations having queued data in rank order, looking for other mobile stations having the same scheduling rate R. If the data queued for such mobile stations, when aggregated with the data for the primary mobile station already allocated to the packet, is insufficient to fill the packet, the scheduling unit 64 may expand the search to add mobile terminals with scheduling rates that are higher, by one or more levels, than that of the primary mobile station. For ease of reference, the mobile terminals with both queued data and scheduling rates R of at least as high as the primary mobile station may be referred to herein as "supplemental mobile stations." Thus, the packing filing process advantageously looks to fill an otherwise under-filled packet with queued data for other supplemental mobile stations having associated scheduling rates of R (or $\geq$R). Assuming data is added, the resulting multi-user packet may be transmitted on the downlink packet data channel at rate R to the primary and supplemental mobile stations. This approach allows the base station 40 to more efficiently use the available resources by serving the primary mobile station and other mobile stations in a multi-user packet transmitted on the downlink packet data channel at rate R.

However, in some instances, the amount of data queued for the primary and supplemental mobile stations may not be enough to sufficiently fill the multi-user packet. The present invention, in some embodiments, addresses this situation by conceptually exploring whether more data could be added to the packet's payload by lowering the downlink transmission rate to a rate lower than the rate R associated with the primary mobile station (i.e., the tentative rate)(step 160). Such a process may follow the flowchart shown in FIG. 5. The scheduling unit 64 calculates the aggregate amount of data allocated to the packet (step 210) and compares this to a threshold (step 220). For example, the threshold may be a ratio of 0.50 for the aggregate amount of data compared against the capacity Tc of the packet at the tentative rate. If the aggregate amount of data is more than 50%, and thereby satisfied threshold, the tentative, the tentative rate is selected as the downlink transmission rate, and the packet is transmitted at the selected rate without adding more queued data to the payload of the packet (step 190). If the aggregate amount of data already allocated to the packet is less than 50%, (thereby failing to satisfy the threshold) it is possible that the amount of data transmitted in the packet may be increased by lowering the transmission rate, and the process therefore attempts to find additional queued data to add to the packet. The scheduling unit 64 evaluates the list of candidate mobile stations having queued data in rank order, looking for other mobile stations having an associated achievable rate of the next lower rate R' than the scheduling rate R associated with the primary mobile station (step 230). Assuming that there are some such mobile terminals, the scheduler adds their queued data to the downlink packet (advantageously in rank order) until the packet is full or the list is exhausted. For ease of reference, the mobile stations with lower scheduling rates may be called "additional mobile stations" in order to distinguish them from the "supplemental mobile stations" with higher scheduling rates. If no queued data for additional mobile stations may be added to the packet (step 240), the packet is transmitted at rate R associated with the primary mobile station (step 190). If, on the other hand, queued data for additional mobile stations may be added to the packet (step 240), the queued data is added to the packet, the transmission rate is lowered to R' (step 250), and the packet is transmitted at rate R' (step 190). The result of this process, in some embodiments, is to allow significantly under-filled packets to have additional queued data added thereto by lowering the anticipated transmission rate for the packet.

Figure 5:
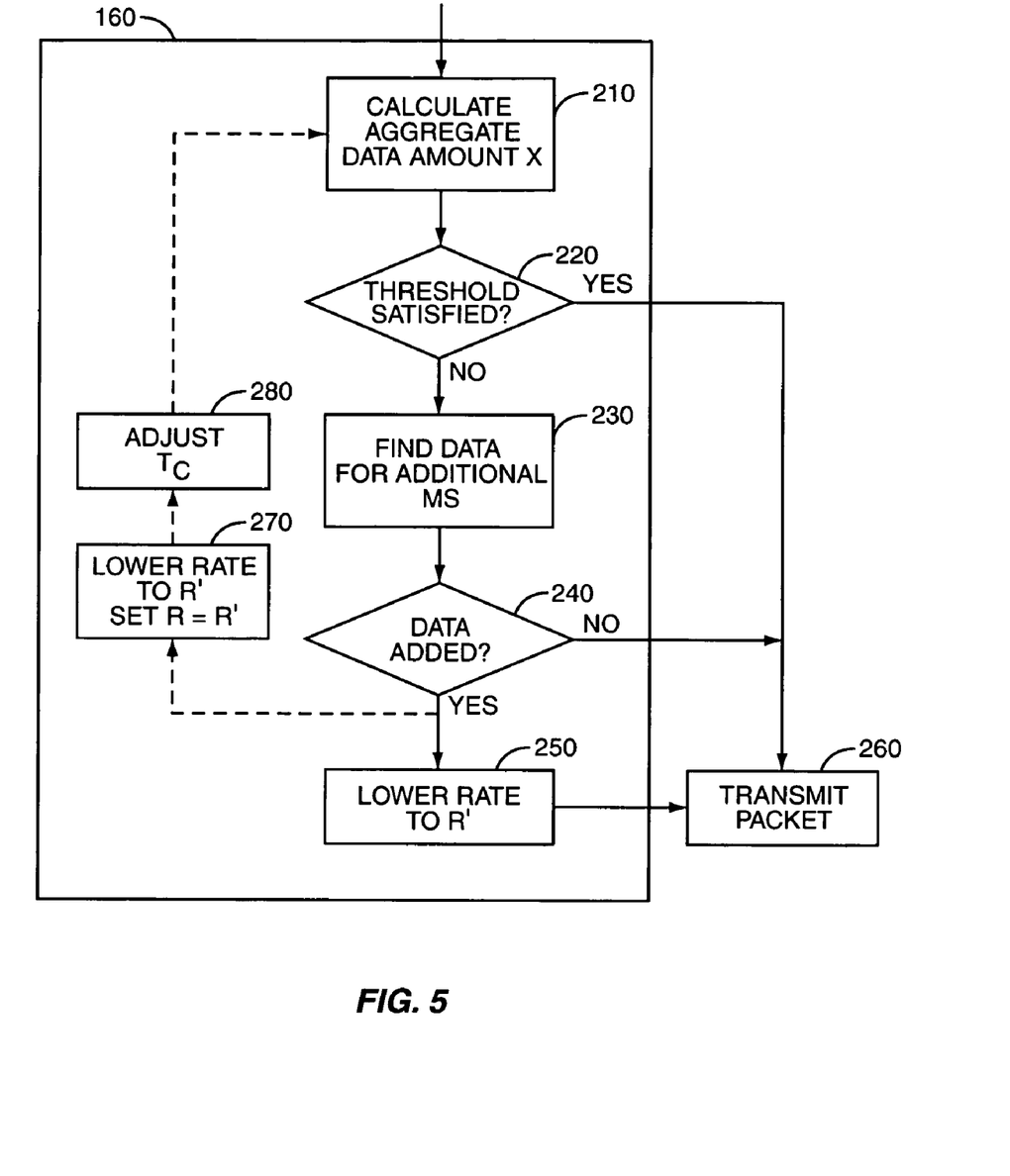
FIG. 5 shows a flowchart for an exemplary packing filling process.

In the discussion above, the illustrative threshold was 0.50, but it should be understood that other threshold values may be used. The value of 0.50 was used as the illustrative example because it is typical in IS-2000 systems for each rate level to be twice the rate of the next lower level. Thus, if X amount of data is to be transmitted at rate R, and X is more than ½ of the capacity Tc of the packet at rate R, then comparing X against 0.50 Tc effectively determines that there will be no net gain in data transmitted by lowering the rate to R'. Likewise, if X is less than ½ of Tc, then comparing X against 0.50 Tc suggests that additional data may be added to the packet if the transmission rate is lowered. However, it should be noted that some systems may have a different relation between adjacent rate levels. If so, then the threshold values should be adjusted accordingly. For example, if each higher rate is only 25% more than the next lower rate, then a suitable threshold value may be ⅘=80%. Of course, the threshold values need not track the rate level relationships, but such is believed advantageous. Further, in some embodiments, if the packet still remains significantly under-filled, then the process may loop back and repeat steps 210-250 one or more times, substituting lowered rate R' for rate R (step 270) and adjusting the capacity of the packet Tc accordingly (step 280).

As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of scheduling use of a downlink packet data traffic channel shared by a plurality of mobile stations, comprising:
    calculating a ranking metric for a mobile station that varies directly with the mobile station's scheduling downlink transmission rate and a delay factor indicative of the oldest data queued for the mobile station by calculating said ranking metric as a function of the scheduling rate divided by the difference between a threshold and the delay factor; and
    scheduling one or more downlink transmissions to the mobile station on the downlink packet data traffic channel based on said ranking metric.

2. The method of claim 1 wherein said threshold represents the maximum allowed delay.

3. The method of claim 1 wherein said ranking metric varies in a direct non-linear fashion with the delay factor.

4. The method of claim 1 further comprising determining said delay factor based on an amount of elapsed time associated with the oldest of the data queued for said mobile station.

5. The method of claim 1 wherein said ranking metric RANK varies according to the formula RANK=$R/(d_{max}-d)^k$, where R represents the mobile station's scheduling downlink transmission rate, $d_{max}$ represents the threshold value of the maximum allowed delay, d represents the current delay factor, and k is a sensitivity exponent.

6. The method of claim 5 wherein k equals one.

7. The method of claim 5 further comprising modifying the value of k upward to increase an effective capacity of the downlink packet data traffic channel.

8. The method of claim 5 further comprising modifying the value of k downward to increase quality of service to said mobile station.

9. The method of claim 1 further comprising determining said delay factor based on an amount of buffer consumed by said queued data.

10. The method of claim 1 wherein said ranking metric RANK varies according to the formula $RANK=R/(q_{max}-q)^k$, where R represents the mobile station's scheduling downlink transmission rate, $q_{max}$ represents the threshold value of the maximum allowed buffer size, q represents the current amount of buffer consumed by said queued data, and k is a sensitivity exponent.

11. The method of claim 1:
wherein said ranking metric RANK varies according to the formula $RANK=R/(d_{max}-d)^k$, where R represents the mobile station's scheduling downlink transmission rate, $d_{max}$ represents the threshold value of the maximum allowed delay, d represents the current delay factor, and k is a sensitivity exponent; and
further comprising transmitting data to said mobile station based on said scheduling in a multi-user downlink packet on the shared downlink packet data traffic channel.

12. A base station for a wireless communications system comprising a scheduler to schedule use of a downlink packet data traffic channel shared by a plurality of mobile stations, said scheduler comprising one or more processing circuits configured to:
calculate a ranking metric for a mobile station that varies directly with the mobile station's scheduling downlink transmission rate and a delay factor indicative of the oldest data queued for the mobile station by calculating said ranking metric as a function of the scheduling rate divided by the difference between a threshold and the delay factor; and
schedule one or more downlink transmissions to the mobile station on the packet data traffic channel based on said ranking metric.

13. The base station of claim 12 wherein said threshold represents the maximum allowed delay.

14. The base station of claim 12 wherein said scheduler is further configured to calculate said ranking metric such that said ranking metric varies in a direct non-linear fashion with the delay factor.

15. The base station of claim 12 wherein said scheduler is further configured to determine said delay factor based on an amount of elapsed time associated with the oldest of the data queued for said mobile station.

16. The base station of claim 12 wherein said scheduler is further configured to calculate said ranking metric RANK according to the formula $RANK=R/(d_{max}-d)^k$, where R represents the mobile station's scheduling downlink transmission rate, $d_{max}$ represents the threshold value of the maximum allowed delay, d represents the current delay factor, and k is a sensitivity exponent.

17. The base station of claim 16 wherein k equals one.

18. The base station of claim 16 wherein said scheduler is further configured to modify the value of k upward to increase an effective capacity of the downlink packet data channel.

19. The base station of claim 16 wherein said scheduler is further configured to modify the value of k downward to increase quality of service to said mobile station.

20. The base station of claim 12 wherein said scheduler is further configured to determine said delay factor based on an amount of buffer consumed by said queued data.

21. The base station of claim 12 wherein said scheduler is further configured to calculate said ranking metric RANK according to the formula $RANK=R/(q_{max}-q)^k$, where R represents the mobile station's scheduling downlink transmission rate, $q_{max}$ represents the threshold value of the maximum allowed buffer size, q represents the current amount of buffer consumed by said queued data, and k is a sensitivity exponent.

22. The base station of claim 12:
wherein said scheduler is further configured to calculate said ranking metric RANK according to the formula $RANK=R/(d_{max}-d)^k$, where R represents the mobile station's scheduling downlink transmission rate, $d_{max}$ represents the threshold value of the maximum allowed delay, d represents the current delay factor, and k is a sensitivity exponent; and
further comprising a transmitter that transmits data packets to said mobile station based on said scheduling in a multi-user downlink packet on the shared downlink packet data traffic channel.

* * * * *